United States Patent
Cockram

(10) Patent No.: US 11,583,769 B2
(45) Date of Patent: Feb. 21, 2023

(54) INCREASING RENDERING PERFORMANCE USING DYNAMIC RESOLUTION

(71) Applicant: Sony Interactive Entertainment Inc., Tokyo (JP)

(72) Inventor: Philip Cockram, Meopham/Kent (GB)

(73) Assignee: Sony Interactive Entertainment Inc., Tokyo (JP)

(*) Notice: Subject to any disclaimer, the term of this patent is extended or adjusted under 35 U.S.C. 154(b) by 114 days.

(21) Appl. No.: 17/021,656

(22) Filed: Sep. 15, 2020

(65) Prior Publication Data
US 2021/0086075 A1    Mar. 25, 2021

(30) Foreign Application Priority Data
Sep. 20, 2019  (GB) .................................... 1913587

(51) Int. Cl.
| | |
|---|---|
| *G06T 1/20* | (2006.01) |
| *G06T 19/00* | (2011.01) |
| *G06T 5/00* | (2006.01) |
| *A63F 13/52* | (2014.01) |
| *G06T 13/40* | (2011.01) |
| *G06T 13/80* | (2011.01) |

(52) U.S. Cl.
CPC .............. *A63F 13/52* (2014.09); *G06T 13/40* (2013.01); *G06T 13/80* (2013.01); *G06T 2200/24* (2013.01)

(58) Field of Classification Search
CPC .... G09G 2340/0407; G09G 2340/0435; G06T 2200/04; G06T 2200/12; G06T 2200/16; G06T 2200/28; G06T 3/40
See application file for complete search history.

(56) References Cited

U.S. PATENT DOCUMENTS

| | | |
|---|---|---|
| 2012/0105452 A1 | 5/2012 | Diard |
| 2012/0188233 A1 | 7/2012 | Shuster |

(Continued)

FOREIGN PATENT DOCUMENTS

| | | |
|---|---|---|
| EP | 1055199 B1 | 5/2002 |
| EP | 2884482 A2 | 6/2015 |
| WO | 2018200993 A1 | 11/2018 |

OTHER PUBLICATIONS

Nixon, Kent W at al., "Scope-quality retaining display rendering based on user-smartphone distance", CCAD '16: Proceedings of the 35th International Conference on Computer-Aided Design, Article 1, pp. 1-6. Nov. 1, 2016. (Year: 2016).*

(Continued)

*Primary Examiner* — Lawrence S Galka
(74) *Attorney, Agent, or Firm* — Matthew B. Dernier, Esq

(57) ABSTRACT

A method of rendering image frames for a videogame includes the steps of, for one or more predetermined features of a virtual environment of a videogame, setting a respective per-frame movement distance threshold; calculating a respective minimum frame rate at which movement of the or each predetermined features of the virtual environment of the videogame between successive image frames remains within the respective movement distance threshold; detecting whether the current frame rate is below one or more of the respective minimum frame rates; and if so, reducing a rendering resolution used during rendering of one or more subsequent image frames to increase the frame rate above one or more of the minimum frame rates.

8 Claims, 4 Drawing Sheets

(56) References Cited

U.S. PATENT DOCUMENTS

| | | | |
|---|---|---|---|
| 2015/0177822 A1* | 6/2015 | Shoshan | G06T 15/005 |
| | | | 345/522 |
| 2016/0328884 A1* | 11/2016 | Schowengerdt | G02B 6/00 |
| 2017/0287446 A1 | 10/2017 | Yuoung | |
| 2018/0040097 A1* | 2/2018 | Saleh | G06F 9/5094 |
| 2019/0206369 A1 | 7/2019 | Kempf | |

OTHER PUBLICATIONS

Combined Search and Examination Report for corresponding GB Application No. GB1913587.0, 14 pages, dated May 19, 2020.

Kent W. Nixon, et al., "Scope-quality retaining display rendering workload scaling based on user-smartphone distance" CCAD '16: Proceedings of the 35th International Conference on Computer-Aided Design, Article 1, pp. 1-6, Nov. 1, 2016.

Doug Binks, "Dynamic resolution rendering article" Code Project, pp. 1-10 https://www.codeproject.com/Articles/254715/Dynamic-Resolution-Rendering, Sep. 19, 2011.

Extended European Search Report for corresponding EP Application No. 20192704.3, 16 pages, dated Mar. 25, 2021.

Anjul Patney, et al., "Towards foveated rendering for gaze-tracked virtual reality" ACM Transactions on Graphics, pp. 1-12, vol. 35, No. 6, Nov. 11, 2016.

\* cited by examiner

INCREASING RENDERING PERFORMANCE USING DYNAMIC RESOLUTION

BACKGROUND OF THE INVENTION

Field of the invention

The present invention relates to a graphical rendering method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional videogame rendering systems (graphics engines, graphics drivers, and/or graphics cards) are known to enable a user to adjust the resolution of a videogame. This may be done for example to match the resolution of a rendered image to the native resolution of a display device.

However, a secondary purpose may be to reduce the resolution of rendered images to enable a higher image frame rate; it will be appreciated that as the graphical complexity of a videogame increases, it typically takes longer to render each pixel in a high resolution image, with the result that the number of images that can be generated per second drops, thereby reducing the frame rate. Furthermore, for some devices, the frame rate is locked to an integer multiple or fraction of a notional TV refresh rate, e.g. 60 frames per second or 30 frames per second, and if the rendering system cannot manage 60 frames per second, it drops to 30 frames per second (even if in practice it could output 45 frames per second), resulting in a notable downward jump in frame rate. Consequently if the user wishes to maintain a high refresh rate (e.g. 60 frames per second), they may select a lower resolution in which there are fewer pixels to render per image and hence, all else being equal, each image can be rendered more quickly.

In particular for devices that lock the frame rate to for example 60 or 30 frames per second, where the failure to reach 60 frames per second results in a notable downward jump in framerate, it is possible for a video game rendering system to employ dynamic resolution adjustment, in which the game evaluates its framerate, and if cannot achieve 60 frames per second then it reduces the rendered resolution of the images so that it can.

However, it will be appreciated that this is potentially undesirable as it creates a potentially unwanted drop in graphical quality.

The present invention seeks to mitigate or alleviate the above problem.

SUMMARY OF THE INVENTION

The instant description discloses a plurality of methods and/or apparatus for rendering image frames fro a videogame.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A graphical rendering method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system or videogame console such as the Sony® PlayStation 4® is an example of a graphical rendering apparatus according to embodiments of the present disclosure, and similarly may implement a graphical rendering method (for example under suitable software instruction) according to embodiments of the present disclosure.

Figure 1:
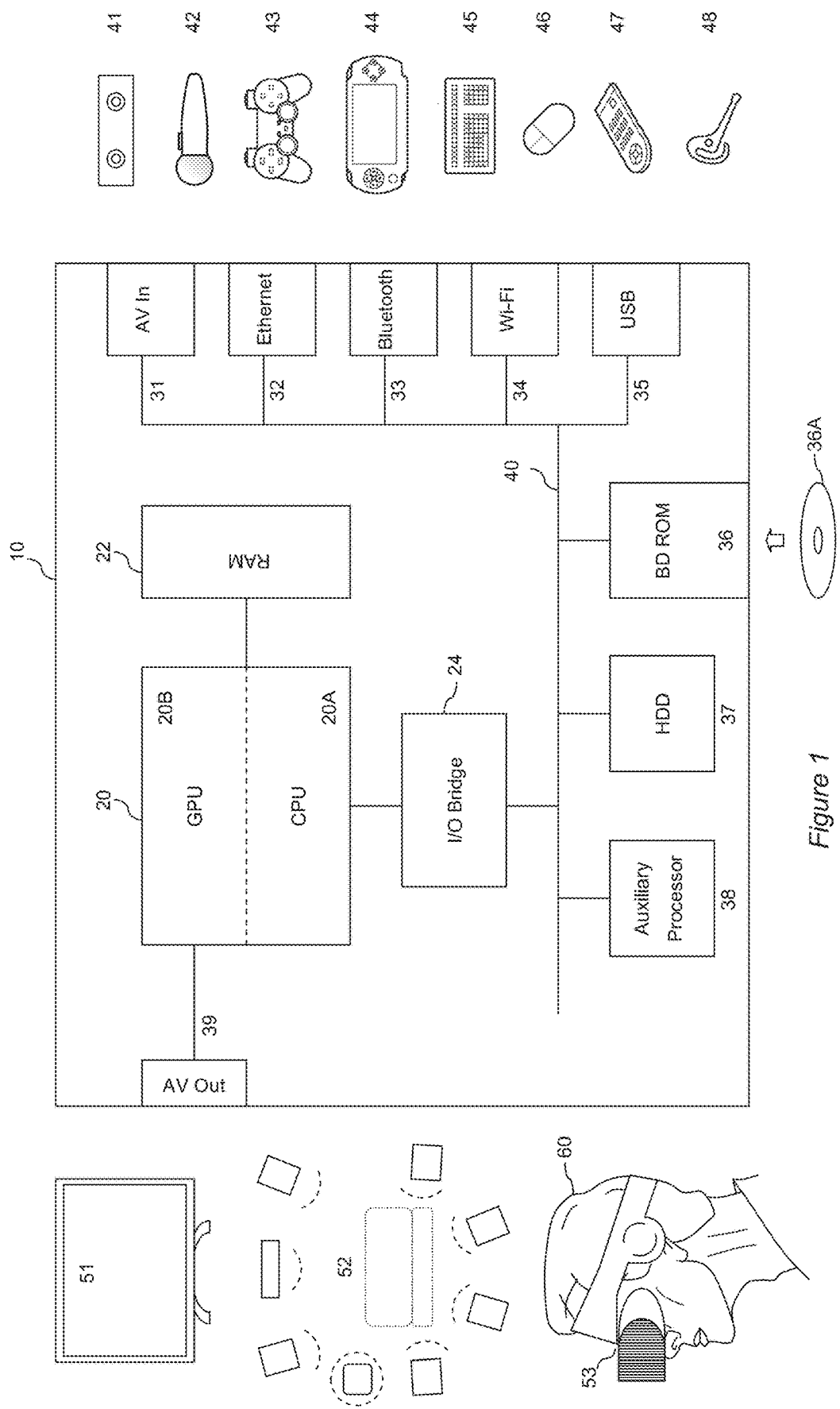
FIG. 1 is a schematic diagram of a system for rendering frames from a videogame in accordance with embodiments of the description.

Referring now to the drawings, wherein like reference numerals designate identical or corresponding parts throughout the several views, FIG. 1 schematically illustrates the overall system architecture of the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

As noted previously, such entertainment device is suitable for implementing a method of rendering image frames for a videogame according to embodiments of the present description.

Figure 2:
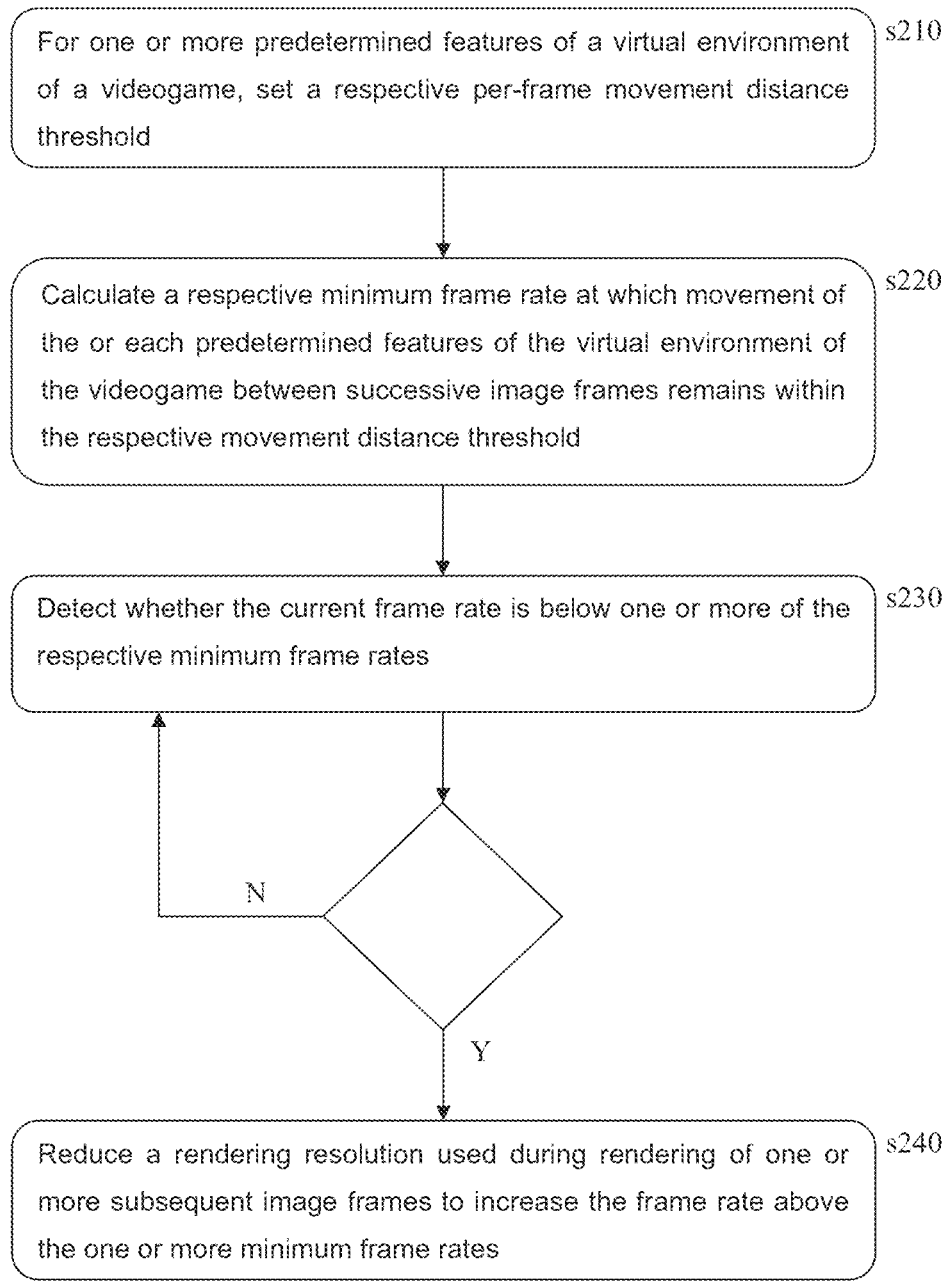
FIG. 2 is a flow diagram of a method of rendering image frames for a videogame in accordance with embodiments of the description.

Referring now also to FIG. 2, such a method of rendering image frames for a videogame comprises in a first step s210, for one or more predetermined features of a virtual environment of a videogame, setting a respective per-frame movement distance threshold.

There are a number of common types of predetermined features of a virtual environment of a videogame, but they fall into two broad categories; the first is scenery, which is typically static with respect to an origin or other reference point of the virtual environment. The second is any mobile in-game object.

Similarly, there are several common types of motion within videogames, and similarly they fall into two broad categories; the first category is movement of an in-game virtual camera whose viewpoint is rendered in the image frame. This camera typically represents either a first person view or a third person view for the player. Hence for example if the videogame relates to a driving game, then the first person view would be a view from within or upon the vehicle, and the motion would be that of the road (and to a lesser extent other static scenery in the virtual environment) relative to the moving camera viewpoint. Hence in this case whilst the road itself is static within the virtual environment, it appears to have relative movement that is visible in successive displayed images rendered from the moving camera viewpoint.

The second category is movement of a mobile in-game object within the virtual environment itself. This may or may not coincide with any virtual camera movement as well; hence for example if a virtual camera tracks the movement of the user's avatar in a third person viewpoint, the relative movement of the user's avatar within successive rendered images may in fact be small.

Typical in-game objects that may move within successive rendered images include but are not limited to; a player avatar or predetermined part thereof; a non-player character (NPC) or predetermined part thereof; an in-game vehicle; an in-game projectile; and an in-game object subject to in-game physics simulation.

Avatars, NPCs, vehicles, projectiles and objects subject to physics simulations may all exhibit movement within successive rendered images. Similarly, individual parts of any of these in game objects may exhibit movement within successive rendered images, and in certain games this may be of significance, such as in fighting games.

The per-frame movement distance threshold may be defined according to any suitable metric; hence in a first instance it may be the in-image shift between successive frames (typically as a resolution independent percentage of screen size, or alternatively as a function of the number of pixels for a given resolution). In a second instance it may be an in environment to shift according to in-game distance units; it will be appreciated that for a fighting game, the shift in a player avatar's hand may be expressed in terms of in-game centimetres, whilst for a space trading game shift in a nonplayer character space ship may be expressed in terms of metres or kilometres.

It will be appreciated that the first instance advantageously automatically accounts for parallax; a predetermined feature of a virtual environment may move by the same amount according to in game distance units, but appear to move much more within successive rendered images if the user is close to it than if they are far from it. By contrast the second instance advantageously identifies changes in position before pixels have been rendered, enabling an evaluation of a shift in position to be proactive rather than reactive. Furthermore in this case the shift according to game distance units can be scaled to account for parallax/distance to the virtual camera to calculate an effective in image shift similar to the first instance above.

In any case, in embodiments of the present disclosure, a game developer may select which predetermined features of the virtual environment are associated with a per frame movement distance threshold, and may select the respective threshold. Optionally, a game developer may provide a user with the option to select one or more of the predetermined features and further optionally select or vary their respective thresholds, or rank some or all of those predetermined features selected by the developer.

Returning to FIG. 2, in a second step s220, the method comprises calculating a respective minimum frame rate at which movement of the or each predetermined features of the virtual environment of the videogame between successive image frames remains within the respective movement distance threshold.

As will be appreciated, there is a fixed relationship between speed, time and distance (e.g. speed multiplied by time equals distance, or similarly distance divided by speed equals time).

Hence for a given speed of movement, there is a period of time in which the corresponding distance moved equals the per-frame movement distance threshold. This period of time is then the respective minimum frame rate.

It will therefore be appreciated that this respective minimum frame rate may therefore vary depending on the behaviour, and in particular the speed, of the predetermined feature of the virtual environment (object, camera or the like) and so may change on a frame-by-frame basis.

It will be appreciated however that the minimum frame rate therefore corresponds to a discreet period of time within which an in game object/camera moves by no more than a threshold distance, and hence increases as the speed of movement of the object/camera increases.

As noted previously, the speed may be determined with reference to in-image pixel shift, or in-environment position shift (optionally further weighted to account for distance to camera).

Subsequently, in a third step s230, the method comprises detecting whether the current frame rate is below one or more of the respective minimum frame rates.

The current frame rate may be treated either as the time taken to generate the immediately preceding displayed image, or an average of the N immediately preceding displayed images (where N typically corresponds to up to 1 second's worth of images), or a prediction of the time it will take to generate the current image as yet to be displayed.

It will be appreciated that where multiple predetermined features of the environment are associated with per frame movement distance thresholds, there may be multiple different respective minimum frame rates.

Optionally, the current frame rate may be compared to the highest respective minimum frame rate, thereby encompassing the requirements of all the predetermined features.

Alternatively however, optionally the step of detecting whether the current frame rate is below one or more of the respective minimum frame rates comprises determining whether the current frame rate is below the respective minimum frame rates of a threshold proportion of predetermined features for which a respective minimum frame rate is calculated.

Hence for example the detection step may determine whether more than half of the predetermined objects have fallen below their minimum frame rate; the threshold proportion may be chosen by the developer and may as non-limiting examples be 10%, one quarter, one half, three quarters, 90%, or 100%. Meanwhile a threshold of 0% defaults back to it comparing the current frame rate to the highest respective minimum frame rate to encompass the requirements of predetermined features. Optionally a developer may change the threshold proportion for different parts of their game.

Similarly alternatively, the step of detecting whether the current frame rate is below one or more of the respective minimum frame rates comprises assigning a priority score to the or each predetermined feature for which a respective minimum frame rate is calculated and summing the priority scores of the or each predetermined feature whose calculated minimum frame rate is above the current frame rate. Then, if the summed priority scores exceed a threshold value, mitigating action may be taken. This approach enables a developer to determine which aspects of the in game environment most benefit from apparently smooth motion (corresponding to a maximum change of position on a frame-by-frame basis) and weighting these accordingly; hence for example the limbs of a user's avatar and their opponent in a fighting game may have a high priority score, whilst the movements of background objects may each have a low priority score.

In this non-limiting example, it may be sufficient for two limbs from a combination of the user's avatar in their opponent to have a minimum frame rate above the current frame rate in order to trigger a mitigating action, whilst by contrast it may require one limb and five background objects to have a minimum frame rate above the current frame rate in order to trigger a mitigating action; hence in this case the limbs of a user's avatar or their opponent are deemed to be five times more important than background objects in terms of the visual impact of their smooth motion upon the user's experience of the game.

It will be appreciated that the above evaluation techniques may be combined in any suitable manner; hence for example certain objects may be weighted so that if their minimum frame rate is not met, they are sufficient to trigger a mitigating action by themselves, and simultaneously if the minimum frame rate of 50% of the predetermined features is not met then this is also sufficient to trigger a mitigating action.

If the current frame rate is detected to be below one or more of the respective minimum frame rate according to any of the above comparison techniques, then the method implements a mitigating fourth step s240, comprising reducing a rendering resolution used during rendering of one or more subsequent image frames to increase the frame rate above one or more of the minimum frame rates.

Typically, a system will have a plurality of resolutions available to it, and so may select a resolution that should achieve the intended increased frame rate. An approximate estimate may be based on a ratio of total pixels at each resolution. Hence for example a full HD resolution of 1920×1080 comprises 2,073,600 pixels, whilst a resolution of 1280×720 comprises 921,600, or approximately half the number. Whilst some steps of generating an image frame may be resolution independent and remain the same, it will be appreciated that the steps relating to per-pixel rendering may thus be halved by this resolution change, and so the time taken to perform these steps of generating the image frame may also be halved.

Hence a resolution that will achieve the intended increased frame rate can be estimated and used for the current or next frame.

It will be appreciated that potentially not all supported resolutions can be used for this process; preferably the resolution will be chosen from a subset having the same aspect ratio as the current resolution so that the resulting image occupies the same amount of the display (typically all of it).

For most modern displays, the aspect ratio is 16:9. Commonly supported pixel resolutions at this aspect ratio include but are not limited to:

3840×2160
3200×1800
2880×1620
2560×1440
2048×1152
1920×1080
1600×900
1280×720
1024×576
960×540
640×360

It will be appreciated that another common aspect ratio is 4:3, for which a number of resolutions are also frequently available.

As noted previously herein, there are several optional criteria for triggering such a mitigating action, and hence the mitigating action itself may differ according to what criteria are used.

Hence in the case where it is determined whether the frame rate is below the respective minimum frame rates of a threshold proportion of predetermined features for which a respective minimum frame rate has been calculated, the step of reducing a rendering resolution used during rendering one or more subsequent image frames includes calculating a resolution to increase the frame rate above the respective minimum frame rates for at least the threshold proportion of predetermined features for which a respective minimum frame rate is calculated.

Meanwhile, in the case where priority scores are assigned to predetermined features and the priority scores are summed for the or each predetermined feature whose calculated minimum frame rate is above the current frame rate, and the step of reducing a rendering resolution used during rendering of one or more subsequent image frames includes calculating a resolution to increase the frame rate above the respective minimum frame rate for at least the predetermined feature with the highest priority score whose calculated minimum frame rate is above the current frame rate.

It will be appreciated that in an instance of any such embodiments, the step of reducing a rendering resolution used during rendering of one or more subsequent image frames to increase the frame rate to a desired minimum frame rate comprises reducing a whole screen rendering resolution, for example by selecting and using one of the resolutions listed above.

Alternatively however, the step of reducing a rendering resolution used during rendering of one or more subsequent image frames to increase the frame rate above a desired minimum frame rate comprises reducing the rendering resolution of a peripheral portion of the image, whilst maintaining the rendering resolution of a target portion of the image, or reducing the rendering resolution of the target portion of the image by an amount less than the reduction to the peripheral portion of the image.

The peripheral portion may be one or of a predetermined proportion of the image adjacent to the outside border of the image (for example a boundary region extending through the outer fifth, quarter or third of the image in each direction). Alternatively, it may be that part of the image more than a predetermined distance from a point of interest within the image corresponding to a predetermined object of interest in the videogame environment; the object of interest typically being defined by the videogame developer, and typically being the player's avatar or the closest non-player character, and optionally a combination of the two, or alternatively been defined automatically for example as the fastest moving in-environment object within a predetermined radius of the camera viewpoint. This assumes that the user pays most attention to the defined object of interest and so focuses their gaze there most of the time. However if gaze tracking of a user's eye or eyes is available, for example if the user is wearing a head mounted display (53) with a gaze tracking capability, then there is no need to assume where the user is paying attention, and the peripheral portion can be defined as that part of the image more than a predetermined distance from a point of interest within the image corresponding to the direction of gaze of a user at a display used to display the image.

Meanwhile, of course if the current frame rate is above the respective minimum frame rate or rates used within the chosen triggering criteria for mitigating actions, then no mitigating action is needed. Indeed optionally, the system can operate in a reverse manner so that the resolution may be increased where this does not cause the frame rate to fall below the desired minimum frame rate or rates, although typically this will be limited by the hardware resolution of the display to which the entertainment device is connected.

The use of gaze tracking to prioritise resolution in a region that the user is paying attention to may be referred to as foveated rendering.

Hence as described above, and also referring to FIG. 3, a method of rendering image frames for a videogame may comprise in a first step s310, setting a preferred (minimum) frame rate for rendering images of the videogame. Hence for example a developer may set a preferred minimum frame rate of 30 frames per second or 60 frames per second, or any suitable frame rate. Alternatively or in addition the user may set a preferred minimum frame rate, for example using a graphical user interface with the game.

Alternatively or in addition, the preferred minimum frame rate may be set using the distance-based techniques described previously herein for one or more in game objects.

In a second step s320, the method comprises tracking the gaze of the user on a display used to display rendered images of the videogame. Typically this is achieved using a gaze tracking system, which in turn typically comprises a camera or other sensor capable of determining the direction of gaze of a user's pupil so that the approximate position of the user's gaze on the display can be estimated. Alternatively, this may be achieved by assuming that the user's gaze is directed to a predetermined object or objects of interest, as described previously herein.

In a third step s330, image frames are generated using foveated rendering, in which an effective image resolution is higher in the region of the display that the user is gazing at than in regions of the display that the user is not gazing at.

Hence foveated rendering typically comprises determining a point of interest within an image corresponding to the direction of gaze of a user at a display used to display the image, rendering a part of the image that is within a predetermined distance from the point of interest at a first resolution, and rendering at least part of the remainder of the image at one or more subsequent resolutions that are lower than the first resolution.

Figure 4A:
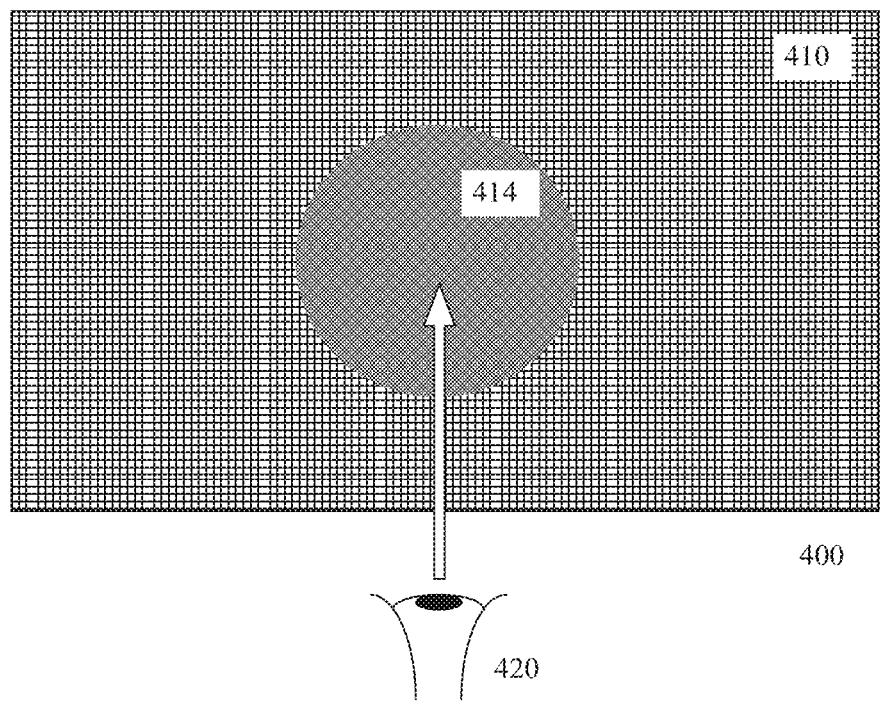
FIGS. 4A and 4B are schematic diagrams of foveated rendering in accordance with embodiments of the description.
Figure 4B:
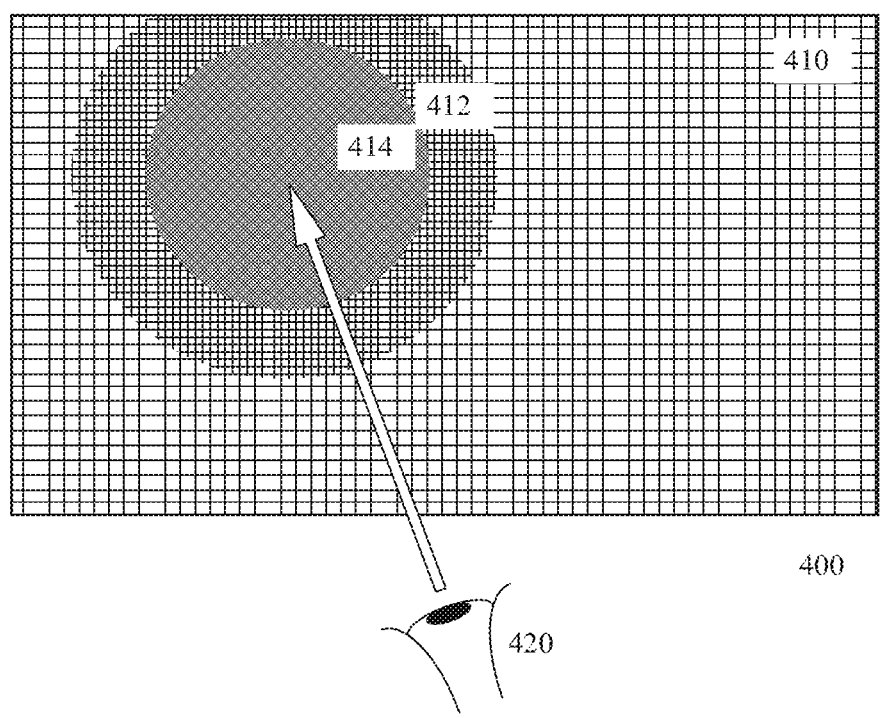

Referring to FIGS. 4A and 4B, this can be understood as generating an image at an effective high or full resolution in an area 414 roughly corresponding to the area of the image cast on to the fovea of the users eye, where the fovea is the highest resolution region of the retina and that portion of the image seen by a user to which there attention is typically directed. Outside of this region in the remainder of the image 410, the image can be generated at an effective lower resolution with reduced impact on the perceived visual quality of the overall image by the user. The effective lower resolution can be achieved for example by only rendering $\frac{3}{4}$, $\frac{2}{4}$, $\frac{1}{4}$, $\frac{2}{3}$, $\frac{1}{3}$, $\frac{1}{6}$, or $\frac{1}{8}$ pixels, for example, in a regular pattern (so for example rendering $\frac{2}{4}$ pixels may result in a chequerboard pattern of rendered and unrendered pixels), and then using a low-cost bloom or dilation function to use rendered pixels to fill-in unrendered pixels in the final image, either by simple duplication, or by transitioning or blending between rendered pixels.

Whilst FIG. 4A illustrates a high versus lower resolution implementation, FIG. 4B illustrates a three-level gradation of resolution with a high resolution render within the fovea region 414, a medium resolution render within a region surrounding the fovea 412, and a low resolution render for the remainder of the image 410. Hence more generally foveated rendering may comprise rendering two or more parts of the remainder of the image (i.e. outside the high-resolution fovea region 414) at successively lower resolutions, as a function of distance from the point of interest.

It will be appreciated that the size of the fovea region 414 and of any surrounding region 412 (or a concentric set of such regions with corresponding successive reductions in resolution) may be selected by the developer of a game, or the developer of a driver for a head mounted display, or the developer of the hardware for a head mounted display, and hence may be incorporated into the game, the driver, the hardware of head mounted display or the operating system of the entertainment device hosting such a head mounted display, for example if it receives content from that entertainment device.

Similar to the embodiments described previously, the method then comprises a step s340 of detecting whether the current frame rate is below the preferred frame rate. As described previously herein, the current frame rate may be based on the time taken to generate the immediately preceding frame, or an average of N preceding frames, or a time estimated for generating the current frame, and the preferred frame rate may be a single, global preferred minimum frame rate set by the developer of the user, or as described previously herein relate to a frame rate encompassing a proportion of minimum frame rates of predetermined features of the virtual environment, or relate to a frame rate encompassing a number of predetermined features of the virtual environment whose priority score exceeds a threshold, and the like.

If such a criterion is met (e.g. if the current frame rate is below the preferred frame rate), then the method comprises a further step s350 of reducing a rendering resolution used during rendering of one or more regions of the display that the user is not gazing at for one or more subsequent image frames to increase the frame rate above the preferred frame rate.

In other words, and referring to FIG. 4A, the effective resolution of the remainder of the image 410 is dropped or dropped further before the resolution of the fovea region 414 is dropped, if it is dropped at all.

Hence for example if the fovea region has an effective resolution of 1920×1080, and the remainder of the image has an effective resolution of 1600×900, then in order to increase the frame rate to above the preferred frame rate, the remainder of the image may drop to an effective resolution of 1280×720, whilst the fovea region remains at 1920×1080. This may achieve the desired frame rate, but if not, then the remainder of the image may reduce its resolution further.

Optionally, the remainder of the image may have a first minimum resolution, such as for example 1024×576; in this example, if the frame rate cannot increase above the preferred frame rate by reducing the resolution of the remainder of the image to 1024×576, then at that point the effective resolution of the fovea region may also be reduced. In turn the fovea region may have a first minimum resolution such as for example 1280×720; if the frame rate still cannot increase above the preferred frame rate after also dropping the fovea region resolution down to 1280×720, then the remainder of the image may reduce in resolution further, for example optionally as far as second minimum resolution such as 640×360; after this resolution is reached by the remainder of the image, the fovea region may again proceed to drop in resolution, optionally down to no further than a second minimum 960×540, and so on. If, in principle all the regions of the image reach their final predetermined minimum resolution and the frame rate is still not at or above the preferred frame rate, then the device may either continue at the frame rate it has achieved, or provide a message to the user indicating that the devices not capable of achieving the preferred frame rate, and (where the preferred frame rate is set by the user), inviting user to change the preferred frame rate or whatever variable directly or indirectly gives rise the preferred frame rate, such as a preferred inter-frame distance of movement of an object, as described previously.

Hence for a remainder of the image having a first part more distant from the point of interest than a second part, the step of reducing a rendering resolution comprises reducing a rendering resolution of a first part of the remainder of the image before reducing a rendering resolution of a second part of the remainder of the image.

It will be appreciated that for a fovea rendering scheme with multiple levels of resolution, as seen in FIG. 4B, this principle of cascading resolution drops up through a hierarchy of regions can apply to two, three, four or more levels of region, with the fovea region being the highest in the cascade and hence the last to have its resolution effectively reduced.

It will be appreciated that the above examples are non-limiting; for example the fovea region may be square or rectilinear rather than round, simply for ease of processing; similarly any intermediate resolution levels may not be exactly concentric; for example there position or shape may be biased towards the centre of the screen or towards a previous position of the users eye; this may be done to account for a tendency for eyes to revert back towards the centre of view (for example after a blink), or for example to accommodate a potential error in eye tracking from the previous eye position.

Furthermore the mechanism by which an effective resolution of a region of the images changed may employ the technique described herein or any suitable technique; in particular hardware that implements any suitable variable resolution rendering process may be employed.

The final image may be output in any form suitable to the display device or devices (51, 53, 44).

Figure 3:
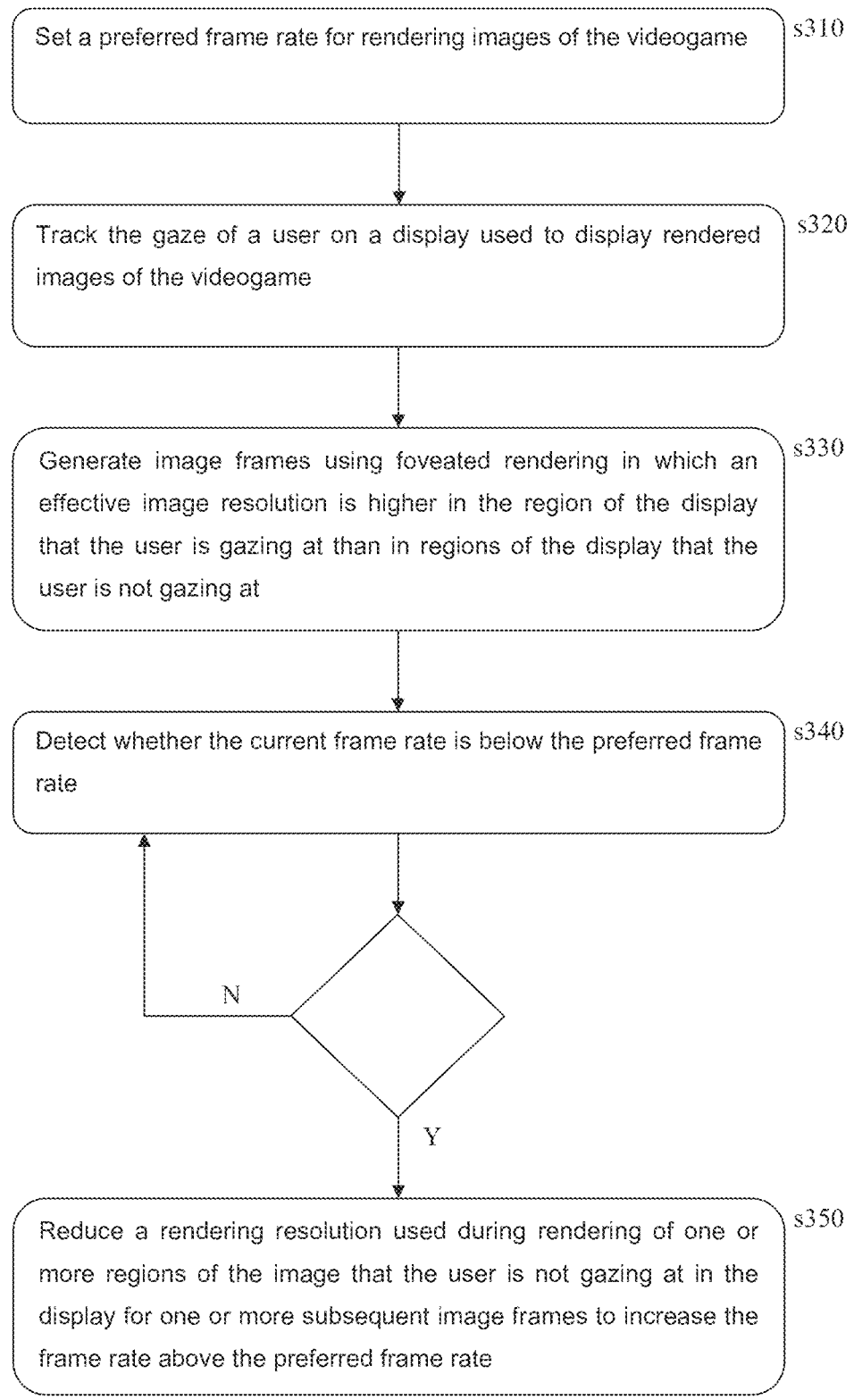
FIG. 3 is a flow diagram of a method of rendering image frames for a videogame in accordance with embodiments of the description.

It will be appreciated that the techniques illustrated in the flows chart of FIGS. 2 and 3 and as described above can be combined.

For example as described previously herein, the preferred frame rate of step s340 may correspond to the one or more respective minimum frame rates of one or predetermined features of the virtual environment, or any combined measure of these as described previously herein.

Similarly, the step of reducing the rendering resolution may comprise the region based resolution reduction described previously herein, which preferentially favours retaining a higher resolution for the fovea region whilst reducing the resolution of one or more outer remaining regions of the image.

Hence for example the step of reducing a rendering resolution used during rendering of one or more subsequent image frames to increase the frame rate above the minimum frame rate may comprise reducing a rendering resolution used during rendering of one or more regions of the display that the user is not gazing at for one or more subsequent image frames to increase the frame rate above the preferred frame rate.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in an embodiment of the description, a system for rendering image frames for a videogame (such as the Sony® PlayStation 4® entertainment device 10) comprises a memory (such as RAM 22) operable to store respective per frame movement distance thresholds for one or predetermined features of a virtual environment of the videogame; a calculator processor (such as CPU 20A) operable (for example under suitable software instruction) to calculate a respective minimum frame rate at which movement of the or each predetermined features of the virtual environment of the videogame between successive image frames remains within the respective movement distance threshold; a comparison processor (such as CPU 20A) operable (for example under suitable software instruction) to detect whether the current frame rate is below one or more of the respective minimum frame rates; and a rendering processor (such as GPU 20B) operable (for example under suitable software instruction), responsive to the current frame rate being below one or more of the respective minimum frame rates, to reduce a rendering resolution used during rendering of one or more subsequent image frames to increase the frame rate above the one or more minimum frame rates.

It will be apparent to a person skilled in the art that the above system may also implement variations in the above method corresponding to operation of the various embodiments of the method technique as described and claimed herein, including but not limited to:

- the per-frame movement distance represents a change in displayed position of a predetermined feature of a virtual environment of the videogame between successive image frames due to motion of one or more selected from the list consisting of an in-game virtual camera whose viewpoint is rendered in the image frame; a player avatar or predetermined part thereof; a non-player character or predetermined part thereof; an in-game vehicle; an in-game projectile; and an in-game object subject to in-game physics simulation;
- the step of detecting whether the current frame rate is below one or more of the respective minimum frame rates comprising the steps of determining whether the current frame rate is below the respective minimum frame rates of a threshold proportion of predetermined features for which a respective minimum frame rate is calculated; and if so, reducing a rendering resolution used during rendering of one or more subsequent image frames to increase the frame rate above the respective minimum frame rates for at least the threshold proportion of predetermined features for which a respective minimum frame rate is calculated;
- the step of detecting whether the current frame rate is below one or more of the respective minimum frame rates comprising the steps of assigning a priority score to the or each predetermined feature for which a respective minimum frame rate is calculated;
- summing the priority scores of the or each predetermined feature whose calculated minimum frame rate is above the current frame rate; and if the summed priority scores exceed a threshold value, reducing a rendering resolution used during rendering of one or more subsequent image frames to increase the frame rate above the respective minimum frame rate for at least the predetermined feature with the highest priority score whose calculated minimum frame rate is above the current frame rate;
- reducing a rendering resolution used during rendering of one or more subsequent image frames to increase the frame rate above the minimum frame rate comprises reducing a whole screen rendering resolution; and
- reducing a rendering resolution used during rendering of one or more subsequent image frames to increase the frame rate above the minimum frame rate comprises reducing the rendering resolution of a peripheral portion of the image, where the peripheral portion is one or more selected from the list consisting of a predetermined proportion of the image adjacent to the outside border of the image; that part of the image more than a predetermined distance from a point of interest within the image corresponding to a predetermined object of interest in the videogame environment; and that part of the image more than a predetermined distance from a point of interest within the image corresponding to the direction of gaze of a user at a display used to display the image.

Similarly, in an embodiment of the description, a system for rendering frames from a videogame (such as the Sony® PlayStation 4® entertainment device 10) comprises a memory (such as RAM 22) operable to store a preferred frame rate for rendering images of the videogame; a tracking processor (such as CPU 20A) operable (for example under suitable software instruction) to track a gaze of a user on a display used to display rendered images of the videogame (for example based on data output from a gaze tracking module of a head mounted display); a rendering processor (such as GPU 20B) operable (for example under suitable software instruction) to generate image frames using foveated rendering in which an effective image resolution is higher in the region of the display that the user is gazing at than in regions of the display that the user is not gazing at; a comparison processor (such as CPU 20A) operable (for example under suitable software instruction) to detect whether the current frame rate is below the preferred frame rate; and wherein the rendering processor is operable (for example under suitable software instruction), responsive to the current frame rate being below the preferred frame rate, reduce a rendering resolution used during rendering of one or more regions of the image that the user is not gazing at in the display for one or more subsequent image frames to increase the frame rate above the preferred frame rate.

Again it will be apparent to a person skilled in the art that the above system may also implement variations in the above method corresponding to operation of the various embodiments of the method technique as described and claimed herein, including but not limited to:

- foveated rendering comprising the steps of determining a point of interest within an image corresponding to the direction of gaze of a user at a display used to display the image; rendering a part of the image that is within a predetermined distance from the point of interest at a first resolution; and rendering at least part of the remainder of the image at one or more subsequent resolutions that are lower than the first resolution;
- foveated rendering comprising the step of rendering two or more parts of the remainder of the image at successively lower resolutions, as a function of distance from the point of interest;
- in this case, for a remainder of the image having a first part more distant from the point of interest than a second part, the step of reducing a rendering resolution comprises reducing a rendering resolution of a first part of the remainder of the image before reducing a rendering resolution of a second part of the remainder of the image; and the step of reducing a rendering resolution used during rendering of one or more subsequent image frames to increase the frame rate above the minimum frame rate comprising reducing a rendering resolution used during rendering of one or more regions of the display that the user is not gazing at for one or more subsequent image frames to increase the frame rate above the preferred frame rate.

Finally, as was noted above, these systems for rendering frames from a videogame may be integrated into a single system, in which the or each preferred frame rate corresponds to a respective minimum frame rate at which movement of the or each predetermined features of the virtual environment of the videogame between successive image frames remains within the respective movement distance threshold; and the rendering processor is operable, responsive to the current frame rate being below one or more of the respective minimum frame rates, to reduce a rendering resolution used during rendering of one or more subsequent image frames to increase the frame rate above the one or more minimum frame rates, by reducing a rendering resolution used during rendering of one or more regions of the display that the user is not gazing at for one or more subsequent image frames to increase the frame rate above the preferred frame rate.

It will be appreciated that the above methods, systems, devices and techniques serve to alleviate and mitigate problems associated with the trade-off between frame-rate and resolution by enabling the developer or the user to select those predetermined features of the environment whose step-wise (per-frame) change in position can become too large if the frame rate becomes too low—typically resulting either in poor quality animation of the feature, or difficulty in playing the game due to accuracy issues (e.g. because the step-wise change in position between frames goes past a desired position for staking a shot or dodging a blow, etc). Setting an effective maximum per-frame distance of movement for one or more of such predetermined features can ensure that the frame rate facilitates positional accuracy, and tracks that accuracy even if the in-game speed of the predetermined feature changes. In other words, it enables a smarter decision as to when to maintain framerate at the cost of graphical quality, and does so by identifying what moments in the game are framerate sensitive.

Meanwhile, alternatively or in addition, where gaze tracking is provided either by hardware based tracking of a user's eye or eyes, or by assuming the gaze of the user based on the position of predetermined objects in an image, the perceived impact of varying resolution can be mitigated by reducing the resolution of peripheral regions of the image first and in preference to a fovea region of the image, optionally with a scheme of graceful degradation of resolutions in these respective regions to achieve the desired frame rate.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of rendering image frames for a videogame, comprising the steps of:

for one or more predetermined features of a virtual environment of a videogame, setting a respective per-frame movement distance threshold;

calculating a respective minimum frame rate at which movement of the or each predetermined features of the virtual environment of the videogame between successive image frames remains within the respective movement distance threshold;

detecting whether the current frame rate is below one or more of the respective minimum frame rates by carrying out actions of:

determining whether the current frame rate is below the respective minimum frame rates of a threshold proportion of predetermined features for which a respective minimum frame rate is calculated; and if so, reducing a rendering resolution used during rendering of one or more subsequent image frames to increase the frame rate above the respective minimum frame rates for at least the threshold proportion of predetermined features for which a respective minimum frame rate is calculated.

2. The method of claim 1, in which
the per-frame movement distance represents a change in displayed position of a predetermined feature of a virtual environment of the videogame between successive image frames due to motion of one or more selected from the list consisting of:
i. an in-game virtual camera whose viewpoint is rendered in the image frame;
ii. a player avatar or predetermined part thereof;
iii. a non-player character or predetermined part thereof;
iv. an in-game vehicle;
v. an in-game projectile; and
vi. an in-game object subject to in-game physics simulation.

3. The method of claim 1, in which
the step of detecting whether the current frame rate is below one or more of the respective minimum frame rates comprises the steps of:
assigning a priority score to the or each predetermined feature for which a respective minimum frame rate is calculated;
summing the priority scores of the or each predetermined feature whose calculated minimum frame rate is above the current frame rate;
and if the summed priority scores exceed a threshold value,
reducing a rendering resolution used during rendering of one or more subsequent image frames to increase the frame rate above the respective minimum frame rate for at least the predetermined feature with the highest priority score whose calculated minimum frame rate is above the current frame rate.

4. The method of claim 1, in which reducing a rendering resolution used during rendering of one or more subsequent image frames to increase the frame rate above the minimum frame rate comprises reducing a whole screen rendering resolution.

5. The method of claim 1, in which reducing a rendering resolution used during rendering of one or more subsequent image frames to increase the frame rate above the minimum frame rate comprises reducing the rendering resolution of a peripheral portion of the image, where the peripheral portion is one or more selected from the list consisting of:
i. a predetermined proportion of the image adjacent to the outside border of the image;

ii. that part of the image more than a predetermined distance from a point of interest within the image corresponding to a predetermined object of interest in the videogame environment; and iii. that part of the image more than a predetermined distance from a point of interest within the image corresponding to the direction of gaze of a user at a display used to display the image.

6. A non-transitory, computer readable storage medium containing a computer program comprising computer executable instructions adapted to cause a computer system to perform the method of rendering image frames for a videogame, comprising the steps of:

for one or more predetermined features of a virtual environment of a videogame, setting a respective per-frame movement distance threshold;

calculating a respective minimum frame rate at which movement of the or each predetermined features of the virtual environment of the videogame between successive image frames remains within the respective movement distance threshold;

detecting whether the current frame rate is below one or more of the respective minimum frame rates by carrying out actions of:

determining whether the current frame rate is below the respective minimum frame rates of a threshold proportion of predetermined features for which a respective minimum frame rate is calculated; and if so, reducing a rendering resolution used during rendering of one or more subsequent image frames to increase the frame rate above the respective minimum frame rates for at least the threshold proportion of predetermined features for which a respective minimum frame rate is calculated.

7. A system for rendering image frames for a videogame, comprising:

a memory operable to store respective per frame movement distance thresholds for one or predetermined features of a virtual environment of the videogame;

a calculator processor operable to calculate a respective minimum frame rate at which movement of the or each predetermined features of the virtual environment of the videogame between successive image frames remains within the respective movement distance threshold;

a comparison processor operable to detect whether the current frame rate is below one or more of the respective minimum frame rates by determining whether the current frame rate is below the respective minimum frame rates of a threshold proportion of predetermined features for which a respective minimum frame rate is calculated; and a rendering processor operable, responsive to the current frame rate being below one or more of the respective minimum frame rates, to reduce a rendering resolution used during rendering of one or more subsequent image frames to increase the frame rate above the respective minimum frame rates for at least the threshold proportion of predetermined features for which a respective minimum frame rate is calculated.

8. The system for rendering frames from a videogame of claim 7 in which:

the or each preferred frame rate corresponds to a respective minimum frame rate at which movement of the or each predetermined features of the virtual environment of the videogame between successive image frames remains within the respective movement distance threshold; and the rendering processor is operable, responsive to the current frame rate being below one or more of the respective minimum frame rates, to reduce a rendering resolution used during rendering of one or more subsequent image frames to increase the frame rate above the one or more minimum frame rates, by reducing a rendering resolution used during rendering of one or more regions of the display that the user is not gazing at for one or more subsequent image frames to increase the frame rate above the preferred frame rate.

\* \* \* \* \*